United States Patent
Pijlman et al.

(10) Patent No.: US 9,411,091 B2
(45) Date of Patent: Aug. 9, 2016

(54) LIGHT COLLIMATOR AND LIGHTING UNIT COMPRISING SUCH LIGHT COLLIMATOR

(75) Inventors: Fetze Pijlman, Eindhoven (NL); Michel Cornelis Josephus Marie Vissenberg, Roermond (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 173 days.

(21) Appl. No.: 13/985,060

(22) PCT Filed: Feb. 20, 2012

(86) PCT No.: PCT/IB2012/050751
§ 371 (c)(1),
(2), (4) Date: Aug. 13, 2013

(87) PCT Pub. No.: WO2012/114248
PCT Pub. Date: Aug. 30, 2012

(65) Prior Publication Data
US 2013/0322116 A1  Dec. 5, 2013

(30) Foreign Application Priority Data
Feb. 22, 2011  (EP) .................................. 11155321

(51) Int. Cl.
*F21V 8/00*  (2006.01)
(52) U.S. Cl.
CPC ............ *G02B 6/0035* (2013.01); *G02B 6/0041* (2013.01); *G02B 6/0061* (2013.01)
(58) Field of Classification Search
None
See application file for complete search history.

(56) References Cited

U.S. PATENT DOCUMENTS

| 5,890,791 A | 4/1999 | Saito |
| 6,454,452 B1* | 9/2002 | Sasagawa ............ G02B 6/0061 349/65 |
| 2003/0227768 A1 | 12/2003 | Hara et al. |
| 2004/0105157 A1 | 6/2004 | Matsushita et al. |
| 2004/0141304 A1 | 7/2004 | Nagakubo et al. |
| 2008/0002421 A1 | 1/2008 | Tamaki et al. |
| 2010/0188017 A1 | 7/2010 | Brukilacchio |

FOREIGN PATENT DOCUMENTS

| JP | 2001059965 A | 3/2001 |
| JP | 2008235137 A | 10/2008 |
| JP | 2010193360 A | 9/2010 |
| WO | 2012131636 A | 10/2012 |

* cited by examiner

Primary Examiner — Britt D Hanley
(74) Attorney, Agent, or Firm — Meenakshy Chakravorty

(57) ABSTRACT

The invention provides a light collimator (1) comprising (a) an elongated light waveguide (100) having a waveguide longitudinal axis (101), a waveguide length (wl), a waveguide width (ww) and a waveguide height (wh); the waveguide height (wh) defined by the height between a first waveguide surface (151) and a second waveguide surface (152), the waveguide (100) having an aspect ratio of the waveguide length (wl) and the waveguide width (ww) wl/ww>1; the waveguide comprising a plurality of elongated cavities (110); each cavity (110) comprises a cavity longitudinal axis (111), a cavity length (cl), a cavity width (cw) and a cavity height (ch); each cavity having an aspect ratio of the cavity length (cl) and the cavity width (cw) cl/cw>1, wherein the cavity longitudinal axes (111) of the plurality of cavities (110) are perpendicular to the waveguide longitudinal axis (101); and (b) a diffuse reflective layer (200) adjacent to the second waveguide surface. The invention further provides a lighting unit (2) using such collimator (1).

20 Claims, 4 Drawing Sheets

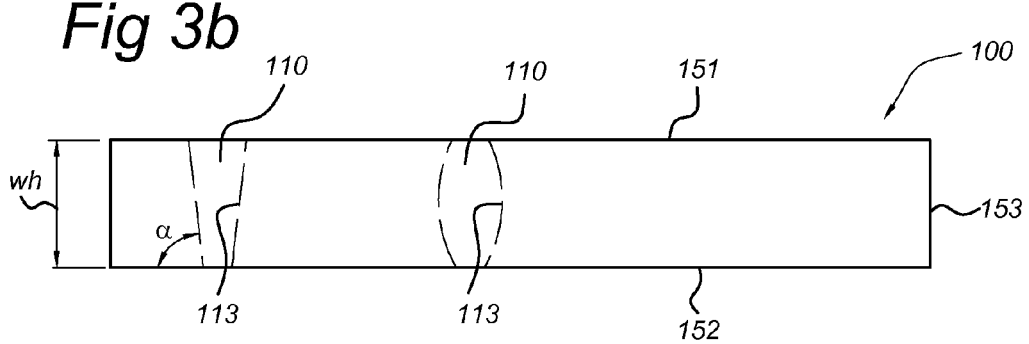
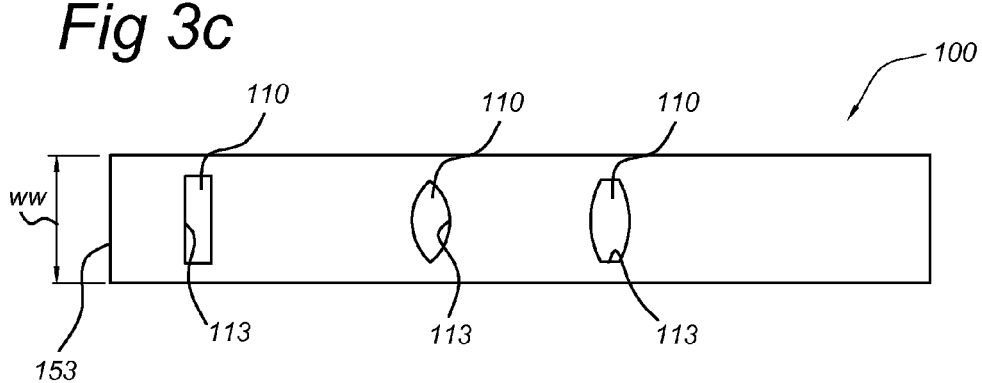
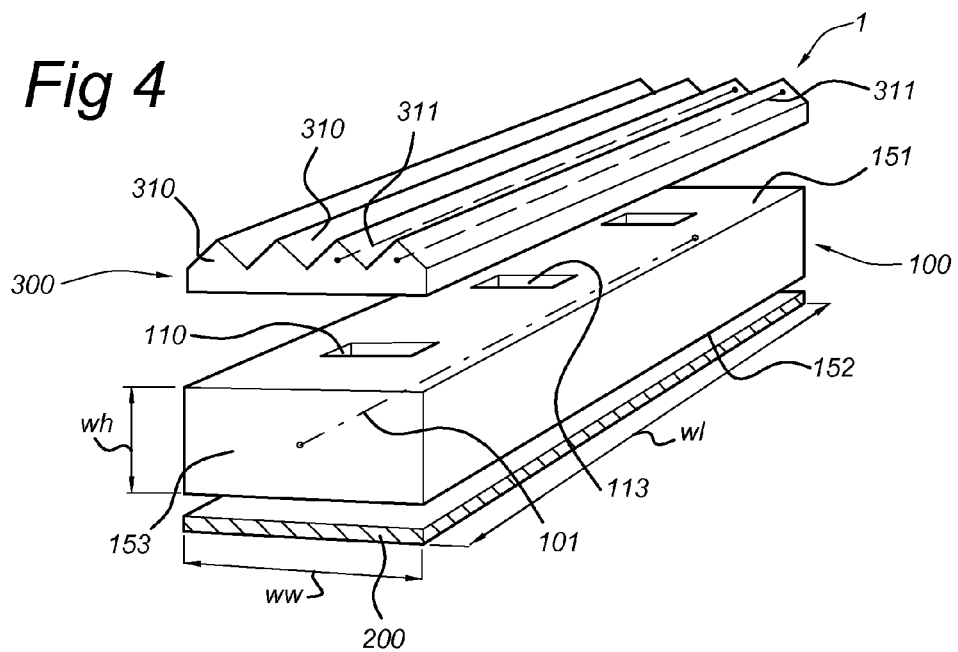

LIGHT COLLIMATOR AND LIGHTING UNIT COMPRISING SUCH LIGHT COLLIMATOR

FIELD OF THE INVENTION

The invention relates to a light collimator and to a lighting unit comprising such light collimator.

BACKGROUND OF THE INVENTION

Linear light emitting devices are known in the art. US-2008/0002421 for instance describes a linear light emitting apparatus including a light source a linear light guide member into which the light of the light source is guided from one end side thereof, and also which includes a projecting portion extending continuously along the longitudinal axis of the linear light guide member. In the upper surface of the projecting portion, there are formed light expanding and reflecting portions each extending over the entire width of the upper surface at given intervals.

This document further describes that on the upper surface of the projecting portion, there are formed light expanding and reflecting portions. The light expanding and reflecting portions can be formed by applying or printing an expanding and reflecting paint, or by enforcing a light expansion and reflection processing such as a drawing operation, or by bonding a light expansion and reflection tape. When the light expanding and reflecting portion is formed by printing, there can be used an acrylic system paint, an epoxy system paint, a urethane system paint or the like. Each light expanding and reflecting portion is formed such that it extends over the entire width of the upper surface of the projecting portion. That is, each light expanding and reflecting portion is formed in such a manner that it extends continuously from one of the two sides of the upper surface of the projecting portion to the other both of which are parallel to the longitudinal axis of the projecting portion. The light expanding and reflecting portions are formed at given intervals in the longitudinal axis direction of the projection portion. For example, the light expanding and reflecting portions are respectively formed such that the more distant the light expanding and reflecting portions are, the higher the densities thereof are.

SUMMARY OF THE INVENTION

Luminaires for general illumination often have a restricted beam. Light at high angles (about 65° or higher) may be directly or indirectly (for instance by reflection via a display) visible to humans. This direct light is of high intensity and therefore it may be annoying. This holds especially for an office environment.

Light guides are often used for light spreading. Light of LEDs is coupled into a light guide. Once being in a light guide, the light propagates in the confined volume till it is extracted by some means. Extraction means used with light guides are usually dots of paint. When light hits the paint, the light is substantially scattered in a Lambertian manner.

Problems associated with the prior art may be how to reduce intensity at high angles and how to extract light (from an elongated light guide) while not disturbing the average direction of propagation of light inside the light guide.

The problem of extraction means in elongated light guide may be that their interaction with the light in the light guide often leads to light leakage on the sides of the light guide. Consider for instance dots of paint. Assuming Lambertian scattering by dots of paint one can estimate that about half of light will have an angle of incidence of 45° with a normal of the scattering surface. This light will substantially be coupled out. The other part of scattered light can be divided in again two parts. The first part will be emitted on average along or against the elongated direction; this part will remain to be guided in the light guide. The second part will be mainly emitted on average perpendicular to the elongated direction. This light will substantially leave the elongated light guide. Summarizing, when using dots of paint about 25% will leave the elongated light guide in the wrong direction.

Hence, it is an aspect of the invention to provide an alternative light collimator which is elongated, as well as an alternative lighting unit comprising such light collimator, which preferably further at least partly obviate one or more of above-described drawbacks.

Here, a specific light collimator is suggested, which is based on an elongated light waveguide. The waveguide is especially edge-lit, especially via an end (or light incoupling face) of the elongated waveguide. The light waveguide is used for spreading and making the light more homogeneous. By making holes in the light guide one can extract the light from the light guide. When (optionally) using an angular reflective layer on top of the holes like an interference stack or a prism foil, one reflect large angles of incidence back into the light guide while transmitting low angles of incidence.

By using elongated holes it surprisingly appears that one may reduce this light leakage as it is far more likely that the light in the hole will enter light guide via the long side of the hole.

It further appears that a diffuse reflective layer adjacent to the opposite of the light exit face is beneficial.

Therefore, in a first aspect the invention provides a light collimator (herein also indicated as "collimator") comprising (a) an elongated light waveguide (herein also shortly indicated as "waveguide" or "light guide") having a waveguide longitudinal axis, the elongated light waveguide having a waveguide length (wl), a waveguide width (ww) and a waveguide height (wh), the waveguide height (wh) defined by the height between a first waveguide surface (herein also indicated as "light exit") and a second waveguide surface, the elongated light waveguide having an aspect ratio of the waveguide length (wl) and the waveguide width (ww) wl/ww>1, especially ≥2, such as ≥5, like ≥10, and preferably an aspect ratio of the waveguide length (wl) and the waveguide height (wh) wl/wh>1, especially ≥2, such as ≥5, even more especially ≥10, such as ≥20, or even ≥50, the elongated light waveguide comprising a plurality of elongated cavities, wherein each cavity comprises a cavity longitudinal axis, a cavity length (cl), a cavity width (cw) and a cavity height (ch), each cavity having an aspect ratio of cavity length (cl) and cavity width (cw) cl/cw>1, especially ≥2, such as especially ≥3, such as cl/cw≥10, wherein the cavity longitudinal axes of the plurality of cavities are perpendicular to the waveguide longitudinal axis, and (b) a diffuse reflective layer adjacent to the second waveguide surface.

It appears that with such collimator, when light is coupled into the waveguide from an edge (or edge surface) and substantially parallel to the longitudinal axis, collimated light will be outcoupled from the first surface. This may especially be due to the fact that the cavities are arranged perpendicular to the main direction of light propagation through the waveguide (as seen from the light source) and due to the presence of the diffuse reflective layer adjacent to the second waveguide surface, which allow preferential outcoupling from the first surface (or more precisely, in a direction away from the first surface). Light of the light source may thus be coupled into the elongated waveguide via a front end (and/or back end) and travels substantially parallel with the longitudinal axis of the elongated waveguide.

Hence, whereas prior art solutions provide non-collimated outcoupled light, here the light that is coupled out from the waveguide is collimated. If desired, further collimation can be obtained with an additional collimator layer (see also below). With the present collimator, it is possible to substantially reduce glare, and thus maintain a substantial part of the outcoupled light in within a cone having an angle of 65° or less with a normal to the outcoupling surface. Outcoupling of light from the waveguide is especially perpendicular to the first face (i.e. perpendicular to the elongated waveguide).

Herein, the term longitudinal axis especially relates to an axis that is parallel to the longest surface(s) (here the first surface and second surface), having equal distances to the first surface and the second surface. Further, it may be an axis which is perpendicular to part(s) of the edge surface(s). Further, it may have equal distances to opposite parts of the edge surface(s).

The collimator (more especially the waveguide) is especially a (thin) strip or plate. In general, the waveguide will be substantially longer than wide, and substantially longer than high, i.e. a thin rectangular cuboid. Therefore, the waveguide is indicated as elongated light waveguide. The waveguide has a first surface (outcoupling or exit surface) and an opposite second surface. In general, these two surfaces will be parallel to each other. The distance between these two surfaces also defines the height of the waveguide.

The elongation of the waveguide may also be indicated by the fact that the waveguide has an aspect ratio of the waveguide length (wl) and the waveguide width (ww) wl/ww≥1, even more especially wl/ww≥2, like ≥5, such as ≥10, yet even more especially wl/ww≥20. For instance, 2≤wl/ww≥500.

In fact, this may similarly apply to an aspect ratio between the waveguide length and waveguide height, which may in an embodiment be wl/wh>1, especially wl/wh≥2, like ≥5, such as ≥10, yet even more especially wl/wh≥20, such as even ≥50. For instance, 10≤wl/wh≤500. Especially, wl/wh≥10, such as ≥20.

As indicated above, the waveguide may have the shape of a (thin) rectangular cuboid, such as a thin strip. Hence, the waveguide width will in generally be larger than the waveguide height. Hence, in an embodiment, the waveguide width and waveguide height may have an aspect ratio ww/wh>1, especially ww/wh≥2, such as ≥5, especially ww/wh≥10, yet even more especially ww/wh≥20. For instance, 2≤ww/wh≤100.

Especially, the invention provides an embodiment of the elongated light waveguide having an aspect ratio of the waveguide length and the waveguide width wl/ww≥2, especially ≥10, an aspect ratio of the waveguide length and the waveguide height wl/wh≥2, especially ≥20, and an aspect ratio of the waveguide width and waveguide height ww/wh≥2, especially ≥10. A demo built with wl/ww≥10, wl/wh≥20, and ww/wh≥10 gave good results.

As indicated above, due to the presence of the cavities, one the one hand light is kept in the waveguide, and on the other hand light when being coupled out from the waveguide, may be coupled out in a collimated way. In this way, prior art problems, such as indicated above, may be solved.

In an embodiment, the elongated light waveguide comprises at least 5 elongated cavities, especially at least 10 elongated cavities.

In an embodiment, the elongated light waveguide comprises at least 10 elongated cavities and at least 1 cavity per 20 cm along the waveguide longitudinal axis, especially at least 1 cavity per 10 cm along the longitudinal axis. For instance, an elongated waveguide having a length of 100 cm may comprise 19 cavities (about each 5 cm a cavity).

If desired, the dimensions of the cavities and/or the cavity density may vary over the waveguide. This may for instance be beneficial for the homogeneity of the outcoupled light. For instance, the cavities may be smaller, especially the cavity length, when closer to the light source (light incoupling surface) and may be larger, especially the cavity length, more downstream (i.e. farther from the light source). Likewise, with increasing distance from the light source (or light incoupling surface), the cavity density may increase. The term cavity density may relate to volume of the cavities per waveguide volume. This density may vary over the waveguide.

In a specific embodiment, the elongated cavities have aspect ratios of the cavity length (cl) and the cavity width (cw) cl/cw≥2, especially ≥3, an aspect ratio of the cavity length and the cavity height (ch) cl/ch≥2, and an aspect ratio of the cavity width and cavity height cw/ch≥0.2, such as ≥0.5, like 0.2≤cw/ch≤4.

In an embodiment, the ratio of the cavity heights and waveguide height are ch/wh≥0.5, preferably ch/wh≥0.8. In case the ratio of the cavity height and waveguide height is ch/wh=1, the cavity is a through hole.

The cavities may be through holes, i.e. from the first surface to the second surface, but the cavities may also be blind holes, which may have only one opening to one of the first and the second surface. In fact, the cavities may also be "double blind", i.e. fully enclosed by the waveguide (material). Hence, the elongated cavities are, with respect to the waveguide height, selected from the group consisting of a blind hole and a through hole. Hence, in an embodiment, the cavities are through holes. As will be clear to a person skilled in the art, the waveguide may comprise one type of cavities, but may also comprise a plurality of different types of cavities.

With respect to the waveguide width, the cavity length may be smaller, i.e. not a hole from one part of the edge to an opposite part of the edge. Hence, the cavity may have a ratio of the cavity length and waveguide width cl/ww<1. Especially, this ratio may be 0.001≤cl/ww<1, especially 0.01≤cl/ww<1, like for instance 0.1≤cl/ww≤0.95. Again, this ratio may vary over the waveguide, and for instance increase with increasing distance from a light incoupling surface.

The shape of the cavities may for instance be rectangular or oval. Especially, the elongated cavities have, in the plane of the elongated light waveguide, cross-section shapes selected from the group consisting of an oval shape and a rectangular shape. Especially good collimating results and/or light extraction may be obtained when the cavities have rectangular cuboid shapes. The cavities may have identical shapes and dimensions, but as indicated above, the waveguide may also comprise a plurality of different types of cavities. For instance, cavities having a square cross-section in the plane of the waveguide were also simulated, but waveguides with such cavities clearly gave inferior collimation relative to rectangular or oval cross-sections.

Further especially good collimating and/or light extraction may be obtained when the cavities have a ratio of cavity width and waveguide height in the range of 0.1≤cw/wh≤10, preferably 0.5≤cw/wh≤3. When the ratio is too small, light extraction may become too low; when the ratio is too high, collimation properties may diminish.

In a specific embodiment the aspect ratio of the waveguide length (wl) and the waveguide width (ww) of the elongated light waveguide (100) are wl/ww≥5, and the cavities (110)

have aspect ratios of the cavity lengths (cl) and the cavity widths (cw) are cl/cw≥2, especially cl/cw≥2.

Simulations have shown that the above values may provide best results. For instance, it appeared that with cl/cw≥3 sufficient results were obtained, and with ≥15 even better results were obtained (reduction in loss of about 6 times). Further it appeared that cw/ch is preferably equal to or larger than 0.5 and equal to or smaller than 3.

Especially, the elongated light waveguide has a rectangular cuboid shape, and each cavity has a rectangular cuboid shape (with edges (or edge surfaces) which are perpendicular to the first waveguide surface and the second waveguide surface). Hence, in this way rectangular cuboid shaped cavities are arranged perpendicular to the longitudinal axis of the cuboid shaped waveguide.

As indicated above, the waveguide may comprise a diffuse reflective layer adjacent to the second waveguide surface. The phrase "adjacent to the second waveguide surface" and similar phrases may imply that such layer is in contact with the (second) surface, but it may also imply that there is a non-zero distance between the (second) surface and the layer. For instance, adjacent may imply within a distance of 2 mm, such as within a distance of 1 mm, or even closer, such as in physical contact.

In a specific embodiment, the layer, here the diffuse reflective layer, is in contact with the second surface. In general, such layer will be in contact with substantially the entire (second) surface (see also below). The diffuse reflective layer adjacent to the second surface is especially configured to assist that coupling out of light from the elongated waveguide is essentially via the first surface (i.e. in a direction away from the first surface).

In addition to the diffuse reflective layer adjacent to the second surface, further reflective layers may be provided, especially adjacent to the edge (edge surface) of the waveguide (except for that part of the edge that is used for entrance or incoupling of the light source light). Such reflective layer, especially such edge reflective layer, may in an embodiment be a specular reflective layer, in yet another embodiment, such edge reflective layer may be a diffuse reflective layer. Hence, the light collimator may comprise an edge surface, wherein the light collimator further comprises a (specular) reflective layer at part of the edge surface. Again, such reflective layer may be arranged adjacent to the edge surface (including adjacent to and in physical contact with).

It might be desirable to further collimate the light travelling away from the first surface. Hence, in an embodiment, the light collimator further comprises a collimator layer adjacent to the first waveguide surface. Such collimator layer may for instance comprise one or more of an interference stack and a micro lens optic (MLO) layer.

Alternatively or additionally, the collimator layer comprises a 1D prismatic foil. Hence, in a specific embodiment, the collimator layer comprises a prism foil, wherein the prism foil comprises a plurality of elongated prisms, wherein each elongated prism comprises a prism longitudinal axis, and wherein the prism longitudinal axis are preferably parallel to the waveguide longitudinal axis. Surprisingly, also embodiments wherein the prism longitudinal axes are perpendicular to the waveguide longitudinal axis provide satisfactory results.

The light collimator may especially be configured to suppress radiation escaping from the first surface at an angle larger than 65°. The light collimator may thus be used to reduce glare and/or to provide a thin lighting unit (see also below).

In general, the reflective layer(s) and the optional collimator layer, will be relatively thin. Hence, the dimensions of the light collimator may be substantially the same as the dimensions of the elongated waveguide. Especially, the ratios of length, width and height which are above defined for the elongated waveguide, may also apply to the light collimator. Hence, in a specific embodiment, the light collimator is a collimator plate, such as a strip.

The light source can be any light source. However, especially solid state light sources (solid state LEDs) may be of interest, because of their dimensions. In this way, very thin light collimators can be used and very thin lighting units may be obtained (see also below). Further, the term "light source" may also refer to a plurality of light sources. The light source will be used for edge lighting of the elongated light waveguide.

In a further aspect, the invention provides a lighting unit comprising a light source configured to provide light source light, and the light collimator as defined herein, wherein the light source is arranged to provide light source light to an edge surface of the light collimator in a direction parallel to the waveguide longitudinal axis.

In general, the light source will be arranged in such a way that the optical axis of the beam of light generated by the light source is parallel to the longitudinal axis of the elongated waveguide. Would only one light source be used, the light source will preferably be arranged in such a way that the optical axis of the beam of light produced by the light source coincides with the longitudinal axis of the waveguide. Likewise, two light sources may be applied, arranged opposite of each other, each arranged to provide light source light to opposite parts of the edge surface. Also in such configuration, the light sources may be arranged in such a way that the optical axes of the beams of light by the light sources coincide with the longitudinal axis of the waveguide. As indicated above, the term light source may also refer to a plurality of light sources.

The lighting unit may also comprise a plurality of light sources and a plurality of elongated waveguides. Each elongated waveguide may be configured to function as light collimator, as indicated herein, with one or more accompanying light source(s).

With the present invention, a thin lighting unit may be provided with low or negligible glare. The lighting unit may be applied in for instance an office, a shop, a hospitality area (such as a hotel, a restaurant, a hospital, etc.), etc. For instance, the lighting unit may be applied as embedded unobtrusive light sources (for instance integrated lighting into grid of ceiling).

The term "substantially" herein, such as in "substantially all emission" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of". Perpendicular especially indicates 90°, but some tolerance within ±5° (i.e. 85-95°), especially within ±2°, may in embodiments be acceptable.

Herein, the terms "upstream" and "downstream" relate to an arrangement of items or features relative to the propagation of the light from a light generating means (here the especially the light source), wherein relative to a first position within a beam of light from the light generating means, a second position in the beam of light closer to the light generating means is "upstream", and a third position within the beam of light further away from the light generating means is "downstream".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to a device comprising one or more of the characterizing features described in the description and/or shown in the attached drawings.

BRIEF DESCRIPTION OF THE DRAWINGS

Embodiments of the invention will now be described, by way of example only, with reference to the accompanying schematic drawings in which corresponding reference symbols indicate corresponding parts, and in which:

FIGS. 3a-3c schematically depict some aspects of the cavities in the elongated waveguide;

FIG. 4 schematically depict an embodiment of the light collimator; and

The drawings are not necessarily on scale.

DETAILED DESCRIPTION OF THE EMBODIMENTS

Figure 1A:
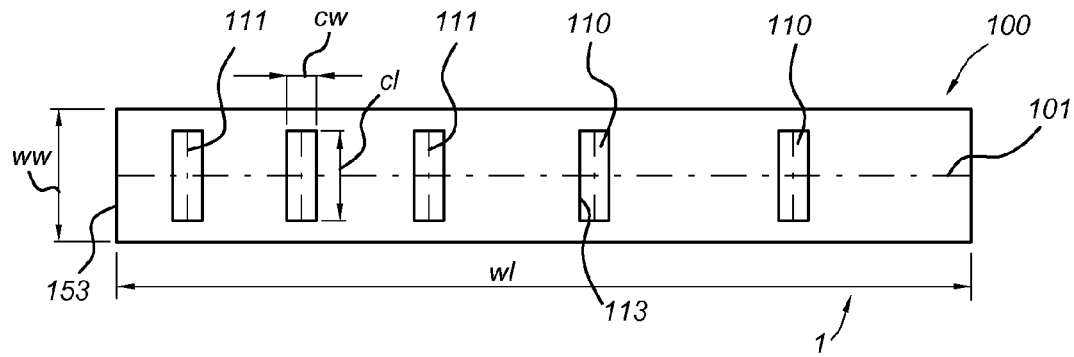
FIGS. 1a-1c schematically depict some embodiments of the light collimator with elongated waveguide having collimating properties.
Figure 1B:
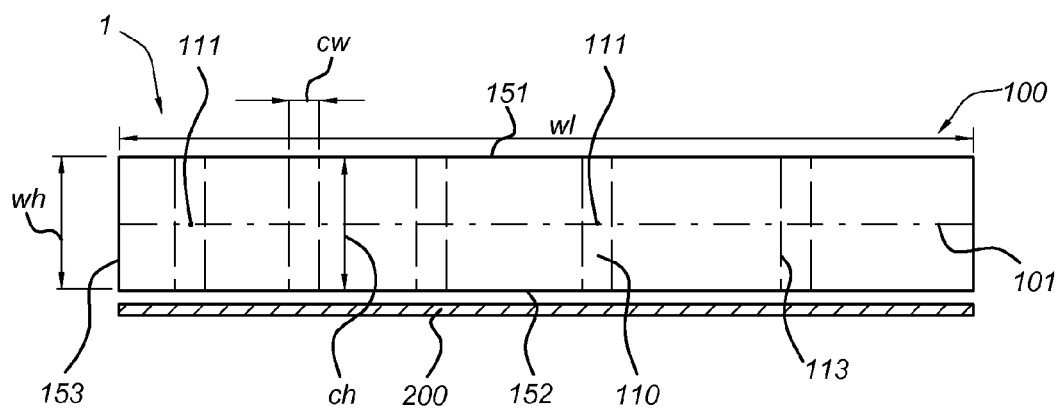

FIG. 1a schematically depicts a top view of a light collimator 1 according to the invention. Since in this drawing, the diffuse reflective layer is not depicted ("below the waveguide"), this figure in fact depicts "only" the elongated waveguide 100. FIG. 1b is a side view of the collimator 1, clearly showing the elongated waveguide 100 and a diffuse reflective layer 200.

The elongated light waveguide 100 has a waveguide longitudinal axis 101, indicated with the dashed line (having length wl). The elongated light waveguide 100 (and here also the longitudinal axis) has waveguide length wl, a waveguide width ww and a waveguide height wh (see also FIG. 1b).

The elongated waveguide 100 comprises a first waveguide surface 151 and a second waveguide surface 152. These surfaces could be indicated in FIG. 1b as top and bottom surfaces, respectively. The waveguide height wh is defined by the height between the first waveguide surface 151 and the second waveguide surface 152.

As can be seen from FIGS. 1a-1b, the elongated light waveguide 100 may have an aspect ratio wl/ww>1, such as ≥10. Further, the elongated waveguide may have an aspect ratio ww/wh>1. Thus, the elongated waveguide 100 may especially be a strip or plate.

The elongated light waveguide 100 comprises a plurality of elongated cavities 110. Each cavity 110 comprises a cavity longitudinal axis 111 (having length cl). Further, each cavity 110 has cavity length cl, a cavity width cw and a cavity height ch. Further, each cavity has (independently) an aspect ratio of cl/cw>1, such as ≥3.

The cavity longitudinal axes 111 of the plurality of cavities 110 are perpendicular to the waveguide longitudinal axis 101. Here, by way of example 5 cavities are schematically depicted. The cavities have edges 113. The waveguide 100 has edge 153, which in this embodiment consists of four faces, also indicated as edge faces.

As indicated above, the light collimator further comprises a diffuse reflective layer 200 adjacent to the second waveguide surface 152. This diffuse reflective layer 200 may be in contact with the second surface 200, and may substantially have the same dimensions as the second surface 200.

Especially, the ratio of the cavity heights (ch) and waveguide height (wh) are ch/wh≥0.5, preferably ch/wh≥0.8.

Figure 1C:
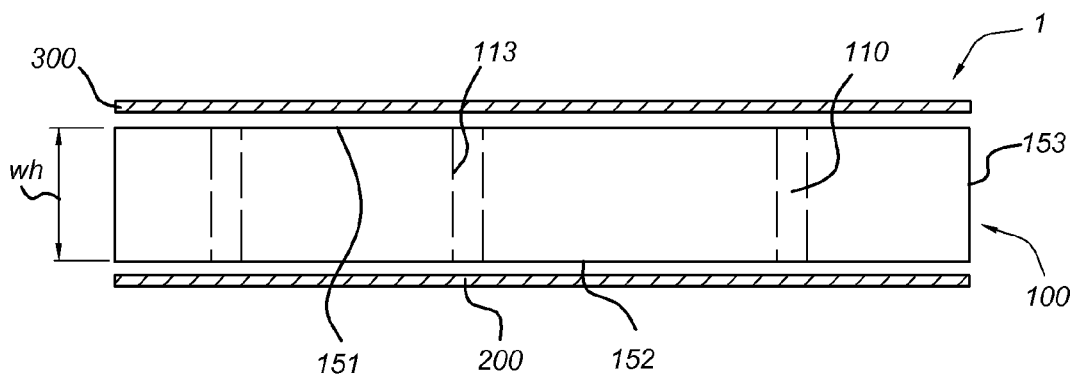

FIG. 1c (side view) schematically depicts an embodiment wherein the light collimator 1 further comprises a collimator layer 300 adjacent to the first waveguide surface 151. This collimator layer 300 may be in contact, e.g. attached, to the first surface 151 (see further also FIG. 4).

Figure 2A:
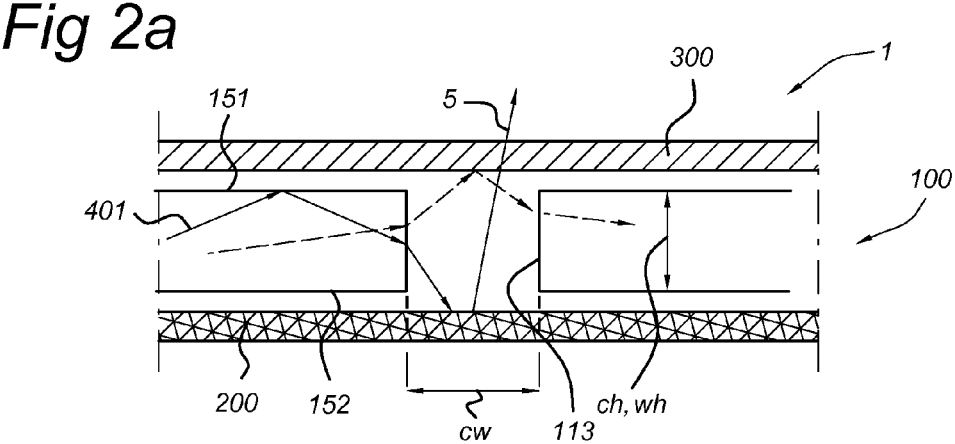
FIGS. 2a-2b schematically depict some aspects of the invention.
Figure 2B:
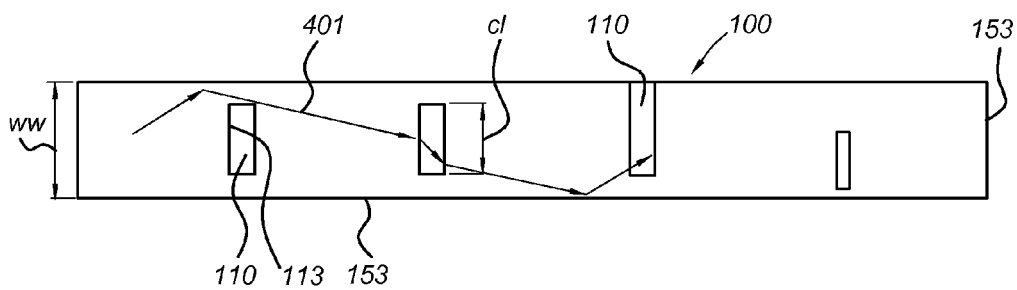

FIGS. 2a-2b schematically depict some principles of the invention. The light guide/waveguide 100 is used for spreading and making incoupled light 401 more homogeneous. By making cavities 110, such as (rectangular or oval) holes in the light guide 100, one can extract light (indicated with reference 5) from the light guide 100. This light is collimated. When further using an angular reflective layer on top of the holes like an interference stack or a prism foil (see also below at FIG. 4), as optional collimator layer 300 adjacent to the first waveguide surface 151), one may further reduce glare and reflect large angles of incidence back into the light guide 100 while transmitting low angles of incidence.

FIG. 2b, top view of the light guide 100 shows rectangular holes as cavities 110. Relative to dots of paint as outcoupling means, one may (relative to for instance paint dots as outcoupling means) reduce with the invention light leakage as it is far more likely that the light in the hole will enter light guide via the long side of the hole. For long elongated holes the fraction of light that is leaving the light guide in the wrong direction equals about cw/cl, where cw is the width of the cavity (here hole) and cl is the length of the hole and cl>cw. Especially, cl/cw≥10. For instance light leakage at cl/cw≥15 is about 3%, compared to about 25% when paint dots would have been used.

Preferably, the cavities have a ratio of cavity width cw and waveguide height wh of 0.1≤cw/wh≤10, such as ≤4, preferably 0.5≤cw/wh≤3.

Figure 3A:
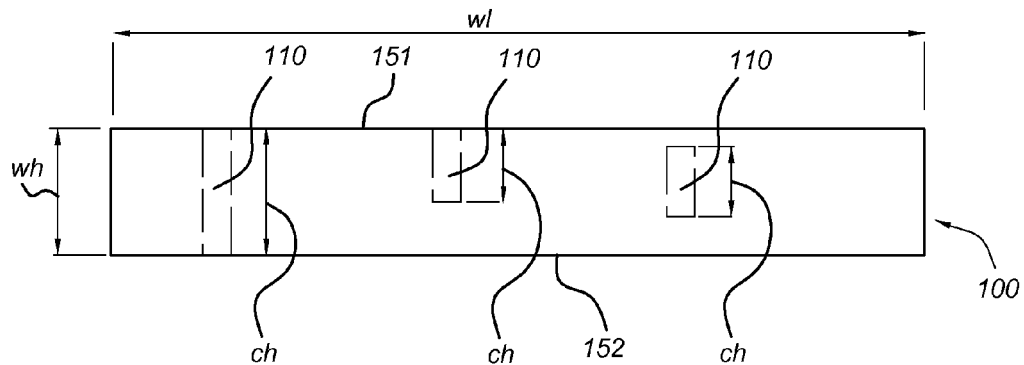

FIGS. 3a-3c schematically depict some aspects of the cavities 110. FIG. 3a (side view) shows that the elongated cavities 110 are, with respect to the waveguide height wh, selected from the group consisting of a blind hole and a through hole. Left, a through hole is shown, where ch=wh, and where the cavity 110 creates an opening in the first surface 151 and in the second surface 152; in the middle a cavity is shown with ch<wh, but with one cavity opening in one of the first surface 151 and second surface 152 (here the first surface 151); and on the right, a double blind hole is schematically depicted, with ch<wh, and wherein the cavity 110 has no openings in the first surface 151 and in the second surface 152.

FIG. 3b (side view) schematically depicts embodiments wherein not all edges of the cavity 110 have right angles. On the left, a cavity 110 is shown with some edges having an angle relative to the first surface or second surface not equal to 90°. Preferably, the smallest angle between the cavity edge and first surface or second surface is within 90°±5°. On the right, an embodiment of the cavity 110 is shown with curved edges. Preferably, the curvature is small. Here cross-sections in a plane perpendicular to the first surface 151 and/or second surface 152 are shown.

FIG. 3c schematically depicts in top view an embodiment of the waveguide 100. On the left the cavity 110 has a rectangular cross-section. The cavity 110 in the middle has an oval cross-section and the cavity 110 on the right has a mixed rectangular/oval cross-section. Here cross-sections in a plane parallel to the first surface 151 and/or second surface 152 are shown. Hence, embodiments are shown wherein in the plane of the elongated light waveguide 100, the cavities 110 have cross-section shapes selected from the group consisting of an oval shape and a rectangular shape. From simulations it could be concluded that such shapes may give best collimating results.

As indicated above, the light collimator 1 may further comprise collimator layer 300 adjacent to the first waveguide surface 151. Especially, as shown in FIG. 4, the collimator layer 300 may comprises a prism foil, wherein the prism foil comprises a plurality of elongated prisms 310, wherein each elongated prism 310 comprises a prism longitudinal axis 311. For best collimation results, the prism longitudinal axes 311 are parallel to the waveguide longitudinal axis 101, although a perpendicular arrangement may also be applied. In this (former) way, the 1D direction of the prisms is parallel to the waveguide longitudinal axis 101. Other (additional) options for the collimator layer 300 are an interference stack and a micro lens optic layer.

FIG. 4 also shows that the longitudinal axis 101 may relate to an axis that is parallel to the longest surface(s) (here the first surface 151 and second surface 152), having equal distances to the first surface 151 and the second surface 152. Further, it may be an axis which is perpendicular to part(s) of the edge surface(s). Further, it may have equal distances to opposite parts of the edge surface(s) (here the side edges (or longitudinal edges).

Figure 5A:
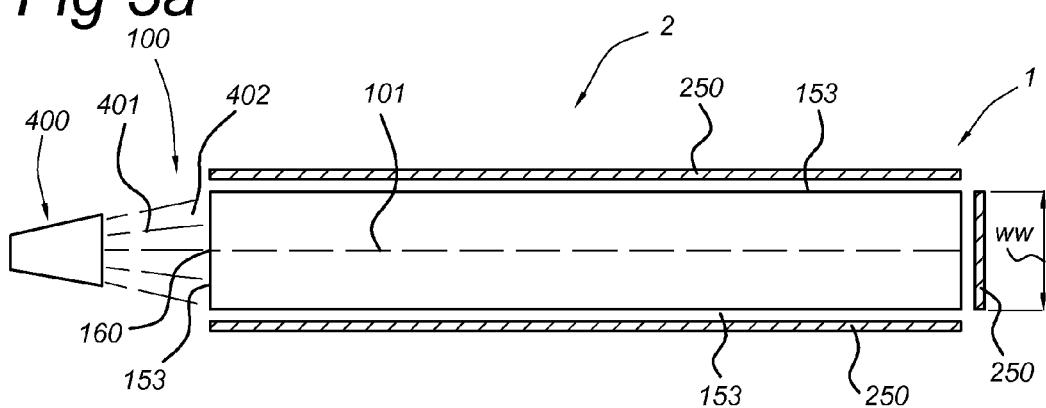
FIGS. 5a-5d schematically depict some embodiments of the lighting unit.
Figure 5B:
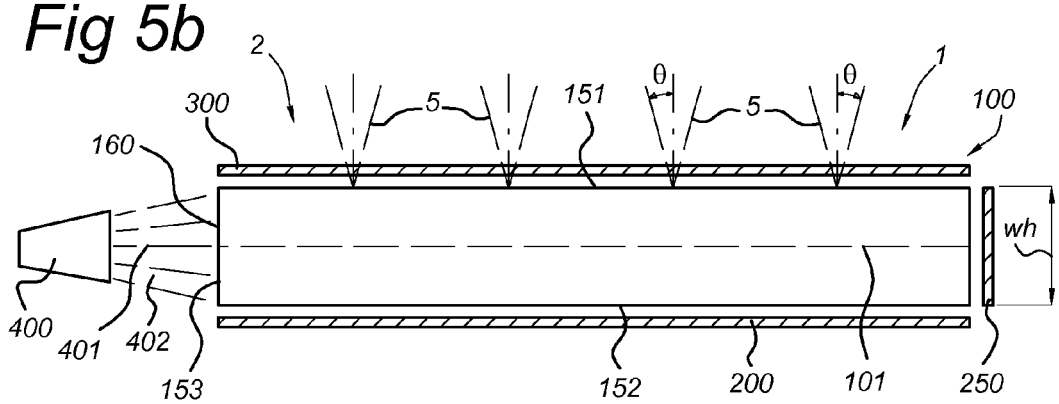

FIGS. 5a and 5b schematically depict a top view and a side view, respectively, of embodiments of a lighting unit 2 according to the invention. For the sake of understanding, the cavities are not shown.

Referring to FIG. 5a, on the left side, a light source 400 is shown, which provides light source light 402 in a beam. The beam has an optical axis 401, which is in this embodiment (with by way of example only one light source 400) configured parallel and substantially coinciding with the longitudinal axis 101. The part of the edge 153 that is used to couple light source light 402 into the waveguide is indicated with reference 160, i.e. the light incoupling surface. Further, additional reflectors may be applied adjacent to the edge 153 at those parts where light is not to be incoupled. These reflectors are indicated with references 250. Here, the waveguide 100 is a rectangular cuboid, and all side edges are provided with a reflectors 250, which may be in physical contact with the edge or edge surface 153.

FIG. 5b schematically depicts a side view an embodiment of the lighting unit 2, with light source light 402 being coupled in via the edge 153, here incoupling surface 160, into the waveguide 100, and being coupled out from the waveguide 100 in a direction away from the first surface 151. The cavities 110 are not shown, but the light 5 escaping from the waveguide 100 in a direction away from the first surface 151 is collimated, and may further be collimated by optional collimator layer 300.

Figure 5C:
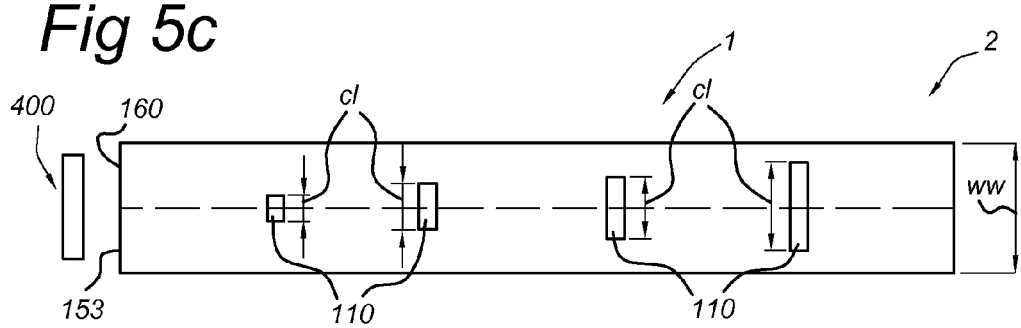

FIG. 5c schematically depicts an embodiment wherein the cavity dimensions vary over the waveguide 100. Closer to the light source 400, the cavity length cl is smaller, while at distances farther away from the light source 400, the length cl of the cavities 110 increases. Such configuration may add to homogeneity of outcoupling.

Figure 5D:
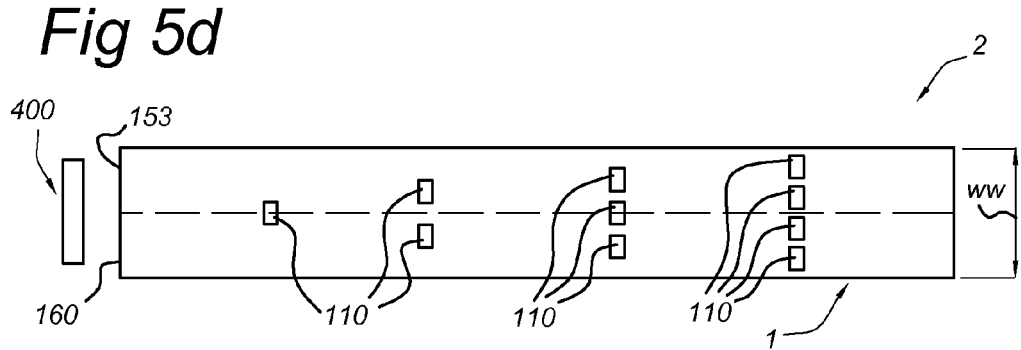

FIG. 5d schematically depicts an embodiment similar to the above embodiment, but now the density of cavities 110 increases with increasing distance from the light source 400. Again, this may have the same purpose as in FIG. 5c.

The glare angle is indicated with θ. Preferably, most of the outcoupled light is within a cone having an angle of 65° or less with the normal, although this may not be necessary for each application. By controlling the herein indicated ratios, especially cw/wh, one may control the collimation. Further, the presence of collimator layer 300 may be used to (further) collimate outcoupled light 5 (i.e. lighting unit light).

The invention claimed is:

1. A light collimator comprising: (a) an elongated light waveguide having a waveguide longitudinal axis, the elongated light waveguide having a waveguide length (wl), a waveguide width (ww) and a waveguide height (wh), the waveguide height (wh) defined by the height between a first waveguide surface and a second waveguide surface opposing said first waveguide surface, the elongated light waveguide having an aspect ratio of the waveguide length (wl) and the waveguide width (ww) of wl/ww>1, the elongated light waveguide comprising a plurality of elongated cavities, wherein each cavity of the plurality of elongated cavities comprises a respective cavity longitudinal axis, a respective cavity length (cl), a respective cavity width (cw) and a respective cavity height (ch), each cavity having a respective aspect ratio of cl/cw>1, wherein the cavity longitudinal axes of the plurality of cavities are perpendicular to the waveguide longitudinal axis, and wherein each cavity height (ch) of a majority of cavities in said waveguide extends over a majority of the waveguide height; and (b) a diffuse reflective layer adjacent to the second waveguide surface.

2. The light collimator according to claim 1, wherein the aspect ratio of the waveguide length (wl) and the waveguide width (ww) of the elongated light waveguide is wl/ww ≥5, and wherein, for each cavity of the plurality of elongated cavities, cl/cw ≥2.

3. The light collimator according to claim 2, wherein the plurality of elongated cavities comprises at least 10 elongated cavities.

4. The light collimator according to claim 3, wherein the elongated cavities are, with respect to the waveguide height (wh), through holes.

5. The light collimator elongated light waveguide according to claim 4, wherein, for each cavity of the plurality of elongated cavities, ch/wh ≥0.5.

6. The light collimator elongated light waveguide according to claim 5, wherein the elongated cavities have, in the plane of the elongated light waveguide, cross-section shapes selected from the group consisting of an oval shape and a rectangular shape.

7. The light collimator according to claim 6, further comprising a collimator layer adjacent to the first waveguide surface.

8. The light collimator according to claim 7, wherein the collimator layer comprises a prism foil, wherein the prism foil comprises a plurality of elongated prisms, wherein each elongated prism of the plurality of elongated prisms comprises a prism longitudinal axis, and wherein the prism longitudinal axes are parallel to the waveguide longitudinal axis.

9. The light collimator according to claim 8, wherein the collimator layer comprises one or more of an interference stack and a micro lens optic layer.

10. The light collimator according to claim 9, wherein, for each cavity of the plurality of elongated cavities, $0.1 \leq cw/wh \leq 10$.

11. The light collimator according to claim 10, comprising an edge surface, wherein the light collimator further comprises a reflective layer at part of the edge surface.

12. The light collimator according to claim 11, wherein $wl/ww \geq 10$, $wl/wh \geq 20$, and $ww/wh \geq 20$.

13. The light collimator according to claim 12, wherein, for each cavity of the plurality of elongated cavities, $cl/cw \geq 3$ and $cw/ch \geq 0.2$.

14. The light collimator according to claim 13, wherein the elongated light waveguide has a rectangular cuboid shape, and wherein each cavity of the plurality of elongated cavities has a respective rectangular cuboid shape.

15. A lighting unit comprising a light source configured to provide light source light, and the light collimator according to claim 14, wherein the light source is arranged to provide light source light to an edge surface of the light collimator in a direction parallel to the waveguide longitudinal axis.

16. The light collimator according to claim 1, wherein, for each cavity of the plurality of elongated cavities, $cl/cw \geq 2$.

17. The light collimator according to claim 16, wherein, for each cavity of the plurality of elongated cavities, $cl/cw \geq 3$.

18. The light collimator according to claim 17, wherein, for each cavity of the plurality of elongated cavities, $cw/ch \geq 0.2$.

19. The light collimator according to claim 18, wherein, for each cavity of the plurality of elongated cavities, $cl/ch \geq 2$.

20. The light collimator according to claim 1, wherein, for each cavity of the plurality of elongated cavities, $cl/cw \geq 10$.

* * * * *